United States Patent [19]

Morita

[11] 4,362,601

[45] Dec. 7, 1982

[54] METHOD FOR DISTILLING ETHYL ALCOHOL BY ADDING SALT OR SALTS

[75] Inventor: Minoru Morita, Kodaira, Japan

[73] Assignee: Tsukishima Kikai Co., Ltd., Tokyo, Japan

[21] Appl. No.: 213,797

[22] Filed: Dec. 8, 1980

[30] Foreign Application Priority Data

Dec. 22, 1979 [JP] Japan .................... 54-166301

[51] Int. Cl.³ ............................... B01D 3/38
[52] U.S. Cl. ........................... 203/19; 203/50; 203/96; 203/97; 203/DIG. 13
[58] Field of Search ............. 203/18, 19, 33, 38, 203/76, 79, 83, 85, 92, 95–97, DIG. 13, 39, 50; 568/913

[56] References Cited

U.S. PATENT DOCUMENTS 2,017,067  10/1936  Kraft ............................ 203/19

FOREIGN PATENT DOCUMENTS 7908  6/1932  Australia ........................ 203/38

Primary Examiner—Frank Sever
Attorney, Agent, or Firm—Blanchard, Flynn, Thiel, Boutell & Tanis

[57] ABSTRACT

A mash column (2) and a rectifying column (4) are used in combination, and impurities contained in mash feed (8) is removed out of the mash column. A salt or salts are added to the top of the rectifying column (4). Alcohol supplied from the mash column (2) is subjected to rectification in the rectifying column (4), and ethyl alcohol is obtained from the top of the rectifying column (4). Bottom products from the rectifying column (4) is concentrated by an evaporator (6) and the concentrated salt or salts solution is recycled to the rectifying column (4). Vapor generated by the evaporator (6) is used as a heat source for the mash column (2).

11 Claims, 2 Drawing Figures

METHOD FOR DISTILLING ETHYL ALCOHOL BY ADDING SALT OR SALTS

TECHNICAL FIELD

This invention relates to a method for distilling ethyl alcohol, and more particularly to a method for distilling hydrous or anhydrous ethyl alcohol in which method a mash column and a rectifying column are used in combination, a salt or salts are added to the top of the rectifying column, bottoms from the rectifying column are concentrated by an evaporator, vapor generated by the evaporator is used as a heat source for the mash column, and hydrous or anhydrous ethyl alcohol is obtained from the top of the rectifying column.

BACKGROUND ART

It has been already known to use a salt or salts in distillation of a binary system. To add salts is effective especially in distillation of a binary system having an azeotrope. By the addition of the salts, vapor-liquid equilibrium is improved, an azeotropic point disappears, the number of trays to be provided in a distillation column for separating the two components is reduced, and a pure product is separated from the azeotropic mixture. According to known methods, a salt or salts are added in such a manner that (1) a solid salt or salts are added to a reflux, or (2) a solution of a salt or salts is mixed with a reflux. However, in the former method, evaporation and drying steps are necessitated to recover the salt or salts with a high purity from a mixture obtained from the base of a column, and the operation of the entire process becomes complicated. The latter method is also unsuitable when it is desired to take off a product of high purity from the top of the column because the salt or salts solution to be added to the top of the tower contains dissolved or suspended impurities to be removed.

In general, the employment of the salt or salts in the process for recovering hydrous or anhydrous ethyl alcohol from fermentation mash involves the following problems:

(1) It is practically impossible to recover and regenerate the salt or salts with a high purity, because the fermentation mash includes various suspended solids or dissolved impurities therein.

(2) A considerably large amount of steam is needed to remove water for recovering the salt or salts, especially when the concentration of salt or salts is low. In fact, the employment of the salt or salts can lower the reflux ratio and curtail the steam consumption necessary for distillation of the product because the salt or salts can improve the vapor-liquid equilibrium and increase the relative volatility, but the total steam consumption of the entire process is increased.

(3) The treatment of the components of the mash feed other than ethyl alcohol, e.g., fusel oil, initial fractions, etc. becomes difficult by the addition of the salt or salts.

The Hiag method described in U.S. Pat. No. 1,891,593 is known as an industrial method for producing anhydrous ethyl alcohol from hydrous alcohol. According to this method, ethyl alcohol is brought into contact with organic acid salts to effect dehydration. More specifically, hydrous ethyl alcohol of 94 to 95 vol% is obtained from a mash column; the liquid ethyl alcohol is fed to the lower portion of a Hiag dehydrating column; vapor is generated by a reboiler provided to the dehydrating column and introduced into a packed tower so as to be brought into contact with descending mixture of alcohol and the salts in a countercurrent manner; and anhydrous ethyl alcohol of 99.5 to 99.9vol% is obtained from the top of the tower, utilizing the absorptivity or adsorptivity of the salts with respect to water. A water-alcohol-salts mixture at the base of the tower is subjected to an evaporation operation to evaporate the alcohol component, and the resultant vapor is directly fed to the base of a rectifying column. On the other hand, the residual mixture of water and salts from which the alcohol component has been removed, is further subjected to an evaporation operation to evaporate water for recovering the salts in the molten form. The so obtained salts are then added to the alcohol at the upper portion of the dehydrating column. This method, however, has such a problem that a very large amount of energy is needed to obtain hydrous alcohol of 94 to 95 vol% from the mash column. This is due to a vapor-liquid equilibrium characteristic of the water-ethyl alcohol system such that the relative volatility is lowered around the azeotropic point and the minimum reflux ratio required for the distillation operation is high.

DISCLOSURE OF THE INVENTION

It is therefore one aspect of the present invention to remove solids (impurities) contained in mash feed from a mash column and to lead the distillate from the mash column to a rectifying column, so as to obviate problems involved in the conventional methods. It is another aspect of the present invention to provide an evaporator to the rectifying column to concentrate bottom products from the rectifying column for recycling the concentrated solution of salt or salts free from the solids to the top of the rectifying column, and to supply vapor generated by the evaporator to the mash column for providing a heat source to the mash column.

In accordance with the present invention, the solids contained in the mash feed are removed from the mash column and the resultant distillate free from the solids is introduced into the rectifying column so that affection of the solids on a recovering operation of the salt or salts from the bottom products of the rectifying column can be avoided and the salt or salts can be recovered effectively with a high purity. Further in accordance with the present invention, the evaporator is provided after the rectifying column, so that the bottom products from the rectifying column can be concentrated thereby to recover the salt or salts, and the vapor generated by the evaporator can be utilized as a heat source for the mash column by supplying the vapor to the base of the mash column. In addition, since the recovered salt or salts are recycled to the top of the rectifying column, the vapor-liquid equilibrium in the rectifying column can be improved, the azeotropic point can disappear, anhydrous alcohol can be obtained directly from the upper portion of the rectifying column, and the number of trays required for the rectification can be reduced to thereby reduce the installation cost of the rectifying column. Whereas, the Hiag method is not economical because hydrous alcohol is produced by ordinary distillation employing a high reflux ratio, without improving the vapor-liquid equilibrium characteristic of the water-ethyl alcohol system and therefore an extremely large amount of energy is required for producing hydrous alcohol of 94 to 95 vol%.

In the method of the present invention, fermentation mash is charged into the mash column. The mash feed contains not only alcohol but also impurities such as salts derived from the fermentation process and solids suspended therein. These impurities (solids) are removed out of the system along with bottom products of the mash column. Therefore, only alcohol vapor or alcohol liquid condensed from the alcohol vapor, which is free from the impurities, is introduced into the succeeding rectifying column. As the mash column, there may be employed a tray column such as a sieve-tray column, a bubble-cap tower, etc. Live steam for heating is supplied to a lower portion of the mash column. This live heating vapor is used in combination with the vapor from the evaporator as will be described in detail later, as a heat source for a rectification operation in the mash column. The vapor from the evaporator may also be used for preheating the mash feed or may be supplied to a reboiler provided at the bottom of the rectifying column for heating the rectifying column, according to necessity. Within the mash column, a rectification operation is carried out by the heating and alcohol vapor is distilled overhead. The number of enriching trays required for the mash column depends upon the concentration of the mash feed, but it is preferably determined so that a part of the enriching trays may be controlled at a temperature of 88° to 92° C. at which fusel oil is liable to be gathered. In general, the fusel oil is drawn out from said part of the enriching trays and separated by cooling in a conventional method. A condenser is provided at the top of the mash column and a portion of the resultant condensate is refluxed. The reflux ratio is selected suitably.

The mixture of water and alcohol is supplied from the mash column to the rectifying column in the form of vapor. Alternatively, all the alcohol vapor may be condensed and supplied to the rectifying column in the liquid form. The latter case, in which the alcohol is supplied to the rectifying column in the liquid form, is advantageous in that the process of the present invention may be applied to an existing distillation column, especially effectively applied to an existing distillation column having a mash column and a rectifying column arranged integrally with each other, only by adding a rectifying column and an evaporator for recovering the salt or salts.

It is generally necessary to remove fusel oil in the distillation process of ethyl alcohol when fermentation mash is used as a feed. In order to reduce the fusel oil content in the product, the fusel oil is removed from the mash column or the rectifying column or may be removed from both the columns. In case the fusel oil is removed from the mash column, it is desired that the alcohol concentration be high at the upper portion of the mash column and the fusel oil be drawn out at the tray of 88° to 92° C. in the mash column. When the alcohol concentration at the upper portion of the mash column is 70 to 80 vol%, fusel oil can be removed effectively. More specifically, if the reflux ratio and the number of the enriching trays are selected suitably in the mash column, the fusel oil content in the alcohol to be supplied to the rectifying column can be reduced to as low as 0.05 wt% when the mash feed contains 0.2 to 0.5 wt% of fusel oil.

The rectifying column carries out an alcohol rectification operation. The alcohol vapor or liquid supplied to the rectifying column generates vapor and the alcohol component is taken off at a stripping section of the rectifying column. At the enriching section of the rectifying column, the liquid descending within the column is heated by the vapor supplied from the mash column to effect enriching and rectifying operations. A salt or salts are added to the top of the rectifying column. By the salt or salts added, the vapor-liquid equilibrium of the water-alcohol system can be improved, azeotropic point can disappear, alcohol can be obtained, at a high concentration, from the top of the rectifying column, and the number of the trays in the rectifying column can be reduced. The type of the rectifying column employable in the present invention is similar to that of the mash column.

The bottom products free from the alcohol content are subjected to evaporation by the evaporator of indirect heating type, which is equipped to the rectifying column, for concentrating the salt or salts contained in the bottom products, and the concentrated salt or salts solution is mixed with the reflux and, then, supplied to the top of the rectifying column. The vapor generated by the evaporator is used mainly for heating the mash column. Thus, at least a portion of the vapor necessary for heating the mash column is obtained within the system, so that the total steam amount to be supplied from the outside can be reduced very much. The evaporator has multiple effects. The evaporator is used for concentrating the salts or salts for regeneration thereof and for generating the vapor to be supplied to the mash column.

As the salts to be added to the rectifying column, there may be preferably employed, for example, a mixture of potassium acetate and sodium acetate. However, any other known salt or salts may be used if they have a low melting point. As described above, since the solids or impurities have been removed from the mash column, the salt or salts can be recovered easily and smoothly at a stripping section of the rectifying column and at the evaporator.

A condenser is provided above the rectifying column, and product alcohol is obtained therefrom, but a portion of the alcohol is refluxed. The reflux ratio is suitably selected according to the required concentration of the product alcohol and the performance of the rectifying column. When the content of an initial fraction (aldehyde) has a critical meaning for the quality of the product alcohol, it is preferred to remove the aldehyde as much as possible, for example, by using two condensers.

If fusel oil is not removed from the mash column or not removed sufficiently from the mash column, the fusel oil accumulates within the rectifying column when the alcohol containing such fusel oil is fed to the rectifying column. In this case, the fusel oil accumulates at a portion of the rectifying column where the alcohol concentration is 40 to 50 wt%. The inventors of the present invention first considered that the behavior of the fusel oil is largely affected by the salt or salts when the salt or salts exist in the solution, but found that the fusel oil will accumulate at said portion irrespective of the existence of the salt or salts. If such fusel oil is not removed therefrom, the product alcohol will contain the fusel oil. Therefore, it is preferred to continuously or intermittently draw out the liquid from the column at the portion. The liquid is, then, introduced into a separator, and an upper layer (containing the fusel oil) of two separate layers formed in the separator is removed. The residual liquid is preferably returned to the rectifying column. As described above, according to the present invention, the fusel oil may be taken off from (1) only the mash column, (2) only the rectifying column, or (3) both the mash column and the rectifying column. Which method is desirable is determined depending upon the fusel oil content in the mash feed, the composition of the fusel oil, the fusel oil content in the alcohol fed to the rectifying column from the mash column and the required purity of the product alcohol. When the purity required for the product alcohol is not so high, it suffices to remove the fusel oil only from the rectifying column. In this case, the relative volatility of the fusel oil is varied in the presence of the salt or salts as compared with that in the water-ethyl alcohol system, and the fusel oil is moved towards the upper portion of the rectifying column so that the quality of the product alcohol becomes crude.

It is preferred to provide a degasifying device in a path for feeding the mash to the mash column for removing carbon dioxide gas from the mash.

The method of the present invention is applicable not only to the production of anhydrous alcohol but to the production of hydrous alcohol. This method is especially effective for a material having an azeotrope other than the ethyl alcohol-water system and contains solids in the solution.

BEST MODE FOR CARRYING OUT THE INVENTION

Figure 1:
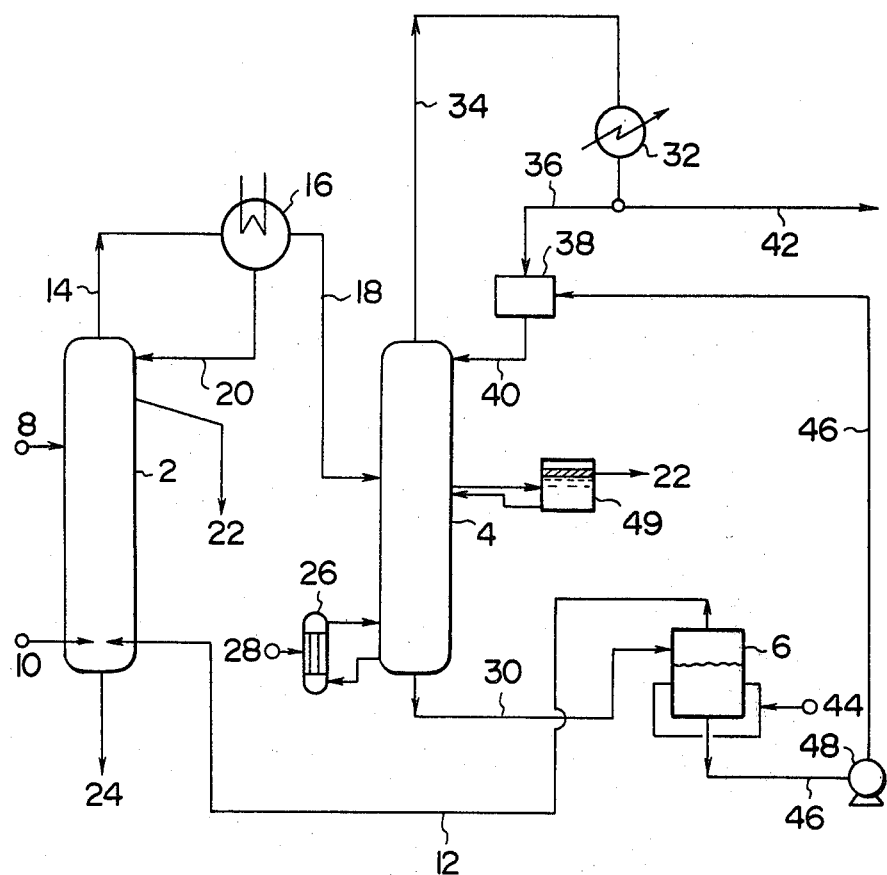
FIG. 1 is a flowsheet of one embodiment of the present invention.

In FIG. 1, 2 is a mash column, 4 is a rectifying column and 6 is a salt evaporator. Fermentation mash 8 containing salts derived from the fermentation process and solids therein is fed to a given position of the mash column 2. Live steam 10 and vapor from the evaporator 6 are supplied to the lower portion of the mash column 2 through an inlet for the heating live steam and through a vapor pipe 12, respectively. Alcohol vapor of the mash fed is rectified upwardly by heating effected by the live steam and the vapor from the evaporator 6. The top of the mash column 2 is connected to a mash column-condenser 16 through a mash column-vapor pipe 14 and further connected to an intermediate portion of the rectifying column 4 through a vapor feeding pipe 18. A portion of the resultant condensate produced in the condenser 16 is refluxed through a reflux pipe 20. A rectifying operation for the alcohol contained in the liquid descending in the mash column 2 is carried out by trays such as sieve trays or bubble caps. The temperature of an enriching stage of the mash column 2 is determined depending upon the concentration of the mash feed, but preferably controlled to be 88° to 92° C. to gather fusel oil. The fusel oil is taken off from such a stage and separated by cooling in a conventional manner (not shown). By the distillation operation in the mash column 2, the solids suspended and/or impurities dissolved in the mash are all gathered into bottom products 24 and discharged out of the system together with the bottom products 24.

When the major portion of the alcohol vapor from the mash column 2 is fed to the rectifying column 4 as described above, vapor is generated by steam 28 supplied to a reboiler 26 provided on the rectifying column 4 so that the alcohol component is recovered to a stripping section of the rectifying column 4. The bottom products free from the alcohol component are fed to the evaporator 6 through a bottom pipe 30. At an enriching section of the rectifying column 4, descending liquid is heated by the vapor supplied from the mash column 2 and a rectification operation is carried out by trays provided within the rectifying column 4.

A rectifying column-condenser 32 is provided above the rectifying column 4 and connected thereto through a vapor pipe 34. A portion of condensate produced in the condenser 32 is introduced into a salt mixing tub 38 so as to be mixed with a salt or salts and, then refluxed to the rectifying column 4 through a salt reflux pipe 40. On the other hand, alcohol condensed in the condenser 32 is taken off as a product through a product draw pipe 42.

In the evaporator 6 into which the bottom products of the rectifying column 4 is introduced, the salt or salts are concentrated by steam 44 supplied to the evaporator 6. The concentrated salt solution is sent to the salt mixing tub 38 through a concentrated solution pipe 46 by a force pump 48. The vapor generated by the evaporator 6 is used as a heat source for the mash column as described above.

By the addition of the salt or salts to the top of the rectifying column 4, the vapor-liquid equilibrium within the rectifying column 4 is improved, an azeotropic point disappears and the number of the trays required for the rectifying column 4 can be reduced to 36 in case the reflux ratio is selected to be 2.5.

Fusel oil 22 accumulated within the rectifying column 4 is removed by taking off the liquid having an alcohol concentration of 40 to 50 wt% into a separating tube 49 and discharging an upper layer of two separated layers. The residual liquid is fed back to the rectifying column 4.

Figure 2:
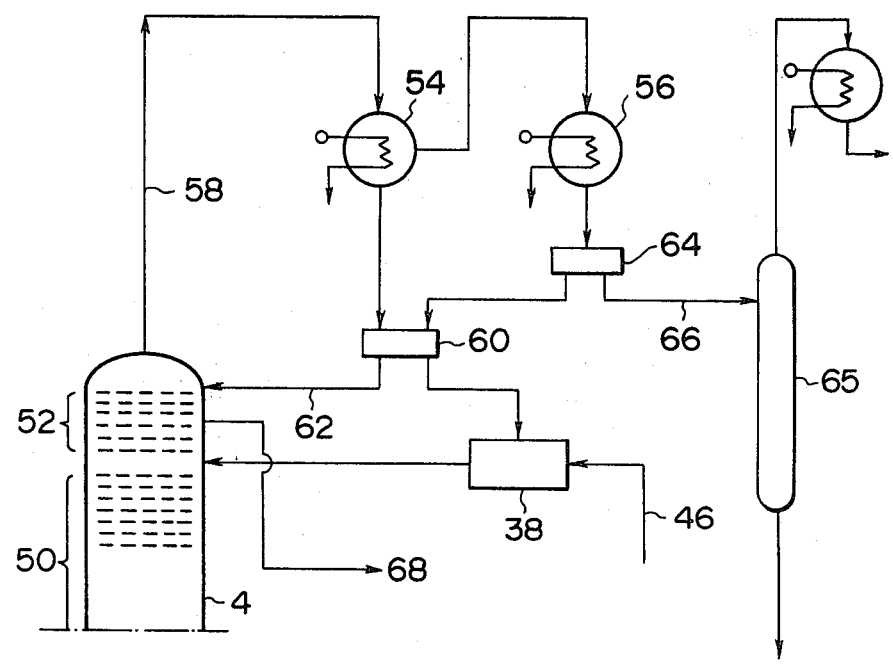
FIG. 2 is a flowsheet of a modified embodiment of the present invention which is suitable for removal of an initial fraction.

In case the content of an initial fraction (aldehyde) is critical for the quality of the product alcohol, it is preferred to employ the arrangement as illustrated in FIG. 2. More specifically, a rectifying section 52 is provided in the rectifying column 4 above an enriching section 50, and a main condenser 54 and an auxiliary condenser 56 are equipped to the rectifying column 4. The vapor from the rectifying column 4 is sent to the main condenser 54 through a vapor pipe 58 and refluxed to the rectifying section 52 through a first distributor 60 and a reflux pipe 62. The vapor in the main condenser 54 is introduced into the auxiliary condenser 56. The resultant condensate in the auxiliary condenser 56 is sent to a second distributor 64. A portion of the condensate is taken off from the system and the remainder is sent to the first distributor 60. A portion of the liquid distributed by the first distributor 60 is led to the salt mixing tub 38 and mixed with the concentrated salt solution from the concentrated solution pipe 46 and, then, fed back to the enriching section 50 below the rectifying section 52.

According to this arrangement, the major portion of the reflux to the rectifying section 52 is the reflux from the main condenser 54, so that the product alcohol 68 taken off from the above-specified stage of the rectifying section 52 contains little aldehyde. In contrast, since the liquid containing alcohol obtained from the auxiliary condenser 56 contains a large amount of aldehyde, the liquid is discharged through a discharge pipe 66. The remainder is led to the salt mixing tub 38 so as to be mixed with the salt or salts and, then, supplied to the enriching section 50 to smoothly carry out an enriching treatment by the addition of the salt or salts. The liquid from the discharge pipe 66 containing a large amount of aldehyde may preferably be treated in an alcohol stripping column 65 to remove the aldehyde and to recover the alcohol component. By this method, the recovery of alcohol can be increased.

EXAMPLE 1

This example was carried out using a pilot plant having the same formation as that illustrated in FIG. 1. The diameter of the mash column was 250 mm. The mash column had 20 sieve trays at its stripping section and 7 sieve trays at its enriching section. Each of the trays had pores of 8 mm diameter and had an opening ratio of 10 %. The rectifying column had a diameter of 250 mm and was provided with 15 trays at its enriching section and 15 trays at its stripping section. The trays of the enriching section is substantially the same as those of the mash column, but the trays of the stripping section are sieve-trays having an opening ratio of 3%. The evaporator provided to the rectifying column was of indirect heating type having a low-pressure heating section and a high-pressure heating section. The total heat transfer area of the evaporator was about 2 m².

A mash feed prepared from a fermentation material of molasses having an alcohol concentration of 7.5 wt% was preheated to a temperature of 90° C. and charged into the mash column at a rate of 380 kg/hr. Live steam was supplied to the base of the mash column at a rate of 53 kg/hr, and vapor generated in the evaporator was also supplied to the base of the mash column. When the reflux ratio is selected to be 1.7, the temperature at the base of the mash column was 107° C., the alcohol concentration of the bottom products were 0.08 wt%, and the temperature of the vapor at the top of the column was 82° C. In a condenser equipped to the mash column, only the reflux was condensed and the remaining vapor was supplied to the rectifying column as dilute alcohol. The reflux ratio of the rectifying column was set to be 1.4. A salt mixture of potassium acetate and sodium acetate in the ratio 4;1 was added to the top of the rectifying column in an amount of 10 kg/hr. Steam was supplied to a reboiler provided at the bottom of the rectifying column at a rate of 7 kg/hr. The temperature at the top of the rectifying column was 78.5° C. As a result, anhydrous alcohol having a concentration of 99.3 wt% was obtained at a rate of 28.0 kg/hr. The temperature of the bottom products at the base of the rectifying column was 108° C. and the alcohol concentration of the bottom products was 0.05 wt%. In the evaporator, the temperature of the liquid at the low-pressure heating section was 145° C. and the steam consumption was 9 kg/hr, while the temperature of the liquid at the high-pressure heating section was 250° C. and the steam consumption was 6 kg/hr. The molten salts regenerated in the evaporator was added to the reflux of the rectifying column.

In the plant operation as specified above, the total steam consumption required for obtaining 1 ton of anhydrous alcohol was 2,679 kg. In this connection, it is to be noted that the steam consumption amount was increased due to heat dissipation from the pilot plant. The consumption would be reduced to 2,350 kg/ton in an actual installation if suitable means is provided for preventing such heat dissipation. Nevertheless, the total steam consumption was reduced very much as compared with that of a conventional method employing azeotropic distillation.

The formulations of the material and the product obtained according to the method as described above are summarized in the following table.

TABLE

| | Material, wt % | Product, wt % |
|---|---|---|
| Ethyl alcohol | 7.5 | 99.3 |
| Aldehyde (Initial fraction) | 0.04 | 0.01 |
| Fusel oil | 0.2 | 0.08 |
| Water | 92.26 | 0.61 |

The anhydrous alcohol obtained in this example can be used as an additive to gasoline.

In the plant employed in this example, the salt concentration in the vapor from the evaporator was 1.5 ppm on the average, and the loss of the salts due to entrainment was as small as negligible as compared with the remarkable curtailment of steam consumption due to the employment of the salts.

EXAMPLE 2

Substantially the same operations as those of Example 1 were carried out except that the reflux ratios were changed. In this example, the reflux ratio of the mash column was 0.3 and the reflux ratio of the rectifying column was 2.8. As a result, the total steam consumption per ton of product anhydrous alcohol was 2,571 kg. The formulation of the product was 99.0 wt% of ethyl alcohol, 0.02 wt% of aldehyde (initial fraction), 0.1 wt% of fusel oil, and 0.88 wt% of water. The total steam consumption would be reduced to 2,260 kg/ton with an actual installation equipped with means for preventing heat dissipation.

I claim:
1. A method for recovering substantially pure ethyl alcohol from a liquid, fermentation mash feed containing ethyl alcohol, comprising the steps of:
(a) feeding the liquid fermentation mash feed into a steam-heated mash column so that said feed flows downwardly in said mash column and simultaneously flowing steam directly upwardly through said mash column in contact with said feed to remove the ethyl alcohol from said feed, discharging from the top of the mash column an overhead fraction consisting essentially of ethyl alcohol and water, and discharging from the bottom of the mash column less volatile impurities initially present in said feed which would otherwise hinder recovery of a regenerated salt solution usable in the following step (b);
(b) feeding said overhead fraction into a rectifying column, simultaneously feeding into said rectifying column near the top thereof one or more salts effective to improve the vapor-liquid equilibrium and to cause the ethyl alcohol-water azeotrope to disappear, discharging substantially pure alcohol vapor from near the top of said rectifying column, condensing said vapor to obtain liquid ethyl alcohol and feeding a portion of said liquid ethyl alcohol to the top of the column as reflux, recovering from the bottom of the rectifying column a bottom component consisting essentially of water and said salt or salts;

(c) evaporating water from said bottom component to obtain separately (1) steam and (2) a regenerated, concentrated salt solution;

(d) recycling said regenerated salt solution for use in step (b); and (e) using the steam produced in step (c) as a part of the steam used for direct heat exchange in step (a).

2. A method according to claim 1, wherein a mixture of said salt solution and liquid ethyl alcohol is refluxed to said rectifying column at a location below a separating stage provided at the upper portion of said rectifying column for separating an initial fraction, and recovering substantially pure ethyl alcohol in the form of liquid from said separating stage.

3. A method according to claim 1, including the step of removing fusel oil from the mash column at a position near the top of said mash column.

4. A method according to claim 1 or claim 3, including the step of removing fusel oil from the rectifying column.

5. A method according to claim 4, wherein the position in the rectifying column from which the fusel oil is removed is a place where the ethyl alcohol concentration is 40 to 50 wt.%.

6. A method according to claim 4, wherein the fusel oil is fed to a separator and is allowed to separate therein into an upper fraction and a lower fraction, and recycling said lower fraction to said rectifying column.

7. A method according to claim 3, wherein the temperature of said position in the mash column from which the fusel oil is removed is from 88° to 92° C.

8. A method according to claim 1, wherein said portion of said liquid ethyl alcohol is mixed with said salt or salts and then is returned to said rectifying column, and the remainder of said liquid ethyl alcohol is removed as the final product.

9. A process according to claim 1, wherein said substantially pure ethyl alcohol vapor contains an aldehyde fraction that must be removed to form the final product ethyl alcohol, wherein said rectifying column is provided with a rectifying section comprising the upper part thereof and an enriching section comprising the lower part thereof, including the further steps of flowing said substantially pure ethyl alcohol vapor through a main condenser and therein partially condensing said substantially pure ethyl alcohol vapor so that said aldehyde fraction remains substantially in a second vapor phase containing a greater proportion of said aldehyde fraction than said substantially pure ethyl alcohol vapor; returning all or part of the condensate of said substantially pure ethyl alcohol vapor to the upper part of said rectifying section of said rectifying column; removing all or part of said second vapor phase from the process to thereby decrease the overall concentration of said aldehyde fraction; and removing said alcohol final product from said rectifying section at a point on said rectifying column below the point at which said condensate is introduced into said rectifying section.

10. A process according to claim 9, further comprising the step of conducting said condensate to a first distributor before returning it to said rectifying column, feeding a part of said condensate from said first distributor to said rectifying column and mixing the remainder of said condensate with said salt or salts and then feeding the mixture to said rectifying column at a position approximately between said rectifying and enriching sections.

11. A process according to claim 9 or claim 10, further comprising the steps of condensing said second vapor phase in an auxiliary condenser to obtain a second condensate; feeding the second condensate to a second distributor, feeding a part of said second condensate from said second distributor to said first distributor and adding it to said first condensate, and removing the remainder of said second condensate from the process to thereby decrease the overall concentration of said aldehyde fraction in the process.

* * * * *